United States Patent
Chang et al.

(10) Patent No.: US 11,140,705 B2
(45) Date of Patent: Oct. 5, 2021

(54) CONFIGURATION OF GRANT-LESS UPLINK TRANSMISSIONS FOR A USER EQUIPMENT

(71) Applicant: APPLE INC., Cupertino, CA (US)

(72) Inventors: Wenting Chang, Beijing (CN); Jeongho Jeon, San Jose, CA (US); Huaning Niu, San Jose, CA (US); Jinyu Zhang, Beijing (CN); Salvatore Talarico, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 113 days.

(21) Appl. No.: 16/604,141

(22) PCT Filed: Jul. 12, 2018

(86) PCT No.: PCT/US2018/041900
§ 371 (c)(1),
(2) Date: Oct. 9, 2019

(87) PCT Pub. No.: WO2019/014498
PCT Pub. Date: Jan. 17, 2019

(65) Prior Publication Data
US 2020/0178288 A1    Jun. 4, 2020

Related U.S. Application Data

(60) Provisional application No. 62/540,390, filed on Aug. 2, 2017.

(30) Foreign Application Priority Data

Jul. 14, 2017  (WO) ............... PCT/CN2017/092939

(51) Int. Cl.
*H04W 72/12* (2009.01)
*H04L 1/00* (2006.01)
(Continued)

(52) U.S. Cl.
CPC ....... *H04W 72/1289* (2013.01); *H04L 1/0003* (2013.01); *H04L 1/1812* (2013.01);
(Continued)

(58) Field of Classification Search
CPC ... H04L 1/0003; H04L 1/1812; H04L 5/0048; H04L 5/0053; H04W 52/58;
(Continued)

(56) References Cited

U.S. PATENT DOCUMENTS 10,420,144 B2 *  9/2019  Kusashima ........... H04W 16/14
10,432,362 B2 * 10/2019  Iyer ..................... H04W 72/042
(Continued)

FOREIGN PATENT DOCUMENTS

WO    2016167828 A1    10/2016
WO    2017039564 A1    3/2017
(Continued)

OTHER PUBLICATIONS

3GPP TS 36.212 , "3rd Generation Partnership Project; Technical Specification Group Radio Access Network; Evolved Universal Terrestrial Radio Access (E-UTRA); Multiplexing and channel coding (Release 11)", V11.5.0, Jun. 16, 2014, 84 pages.
(Continued)

*Primary Examiner* — Ahmed Elallam

(57) ABSTRACT

Technology for a user equipment (UE) operable to decode grant less downlink control information (G-D 5 CI) received from a Next Generation NodeB (gNB) is disclosed. The UE can decode the G-DCI received from the gNB in a MulteFire system. The UE can identify grant less uplink DCI components included in the G-DCI. The UE can perform a grant less uplink transmission with the gNB based on the grant less uplink DCI components in the G-DCI received from the gNB.

19 Claims, 13 Drawing Sheets

(51) Int. Cl.
   *H04L 1/18*     (2006.01)
   *H04L 5/00*     (2006.01)
   *H04W 52/58*    (2009.01)
   *H04W 72/04*    (2009.01)
   *H04W 76/27*    (2018.01)

(52) U.S. Cl.
   CPC .......... *H04L 5/0048* (2013.01); *H04L 5/0053* (2013.01); *H04W 52/58* (2013.01); *H04W 72/0446* (2013.01); *H04W 72/1268* (2013.01); *H04W 76/27* (2018.02)

(58) Field of Classification Search
   CPC ......... H04W 72/0446; H04W 72/1268; H04W 72/1289; H04W 76/27
   See application file for complete search history.

(56) References Cited

U.S. PATENT DOCUMENTS

| | | | | |
|---|---|---|---|---|
| 10,440,747 | B2* | 10/2019 | Kusashima | H04W 16/14 |
| 10,687,219 | B2* | 6/2020 | Yerramalli | H04L 5/0044 |
| 10,708,764 | B2* | 7/2020 | Hayashi | H04W 72/1289 |
| 2018/0041957 | A1* | 2/2018 | Xiong | H04W 72/1268 |
| 2018/0124813 | A1* | 5/2018 | Li | H04W 72/1263 |
| 2018/0139774 | A1* | 5/2018 | Ma | H04L 1/189 |
| 2018/0227936 | A1* | 8/2018 | Yerramalli | H04L 27/2662 |
| 2018/0242317 | A1* | 8/2018 | Marinier | H04W 72/0446 |
| 2019/0014481 | A1* | 1/2019 | Yerramalli | H04W 74/0808 |
| 2019/0174472 | A1* | 6/2019 | Lee | H04W 72/042 |
| 2019/0288809 | A1* | 9/2019 | Iyer | H04B 7/0482 |
| 2019/0289621 | A1* | 9/2019 | Li | H04W 72/1268 |
| 2020/0014495 | A1* | 1/2020 | Niu | H04L 1/188 |
| 2020/0099478 | A1* | 3/2020 | Li | H04L 1/1812 |
| 2020/0106565 | A1* | 4/2020 | Li | H04W 72/042 |
| 2020/0107357 | A1* | 4/2020 | Chang | H04W 72/048 |
| 2020/0128621 | A1* | 4/2020 | Chang | H04L 1/1819 |
| 2020/0205184 | A1* | 6/2020 | Chendamarai Kannan | H04W 72/1284 |

FOREIGN PATENT DOCUMENTS

| | | | | |
|---|---|---|---|---|
| WO | 2017095596 | A1 | 6/2017 | |
| WO | WO2017197086 | A1* | 11/2017 | H04L 5/0048 |

OTHER PUBLICATIONS

3GPP TS 36.213, "3rd Generation Partnership Project; Technical Specification Group Radio Access Network; Evolved Universal Terrestrial Radio Access (E-UTRA); Physical layer procedures (Release 12)", V12.7.0, Sep. 2015, 241 pages.

PCT/US2018/041900, International Search Report and Written Opinion, dated Oct. 2, 2018, 11 pages.

* cited by examiner

| Offset Unit | Offset Unit | Offset Unit | Offset Unit | Offset Unit | Offset Unit | Offset Unit | Time Remain |
|---|---|---|---|---|---|---|---|

FIG. 2A

| Time Remain | Offset Unit | Offset Unit | Offset Unit | Offset Unit | Offset Unit | Offset Unit | Offset Unit |
|---|---|---|---|---|---|---|---|

FIG. 2B

| $selfDefer\_mf$ | $n_{offset\_unit}^{FDM}$ | $selfDefer\_mf$ | $n_{offset\_unit}^{FDM}$ |
|---|---|---|---|
| "000" | 0 | "100" | 4 |
| "001" | 1 | "101" | 5 |
| "010" | 2 | "110" | 6 |
| "011" | 3 | "111" | 7 |

FIG. 3

| Cyclic Shift Field in uplink-related DCI format or MSB 3 bits of *cyclicShift_mf_grantless* | $n^{(2)}_{DMRS,\lambda}$ | | | | $[w^{(\lambda)}(0) \ \ w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 1] | [1 1] |
| 001 | 6 | 0 | 9 | 3 | [1 -1] | [1 -1] | [1 -1] | [1 -1] |
| 010 | 3 | 9 | 6 | 0 | [1 1] | [1 1] | [1 1] | [1 1] |
| 011 | 4 | 10 | 7 | 1 | [1 -1] | [1 -1] | [1 -1] | [1 -1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 1] | [1 1] | [1 1] | [1 1] |
| 111 | 9 | 3 | 0 | 6 | [1 -1] | [1 -1] | [1 -1] | [1 -1] |

FIG. 4

| cyclicShift | LSB 3 bits of *cyclicShift_mf_grantless* | $n_{DMRS}^{(1)}$ |
|---|---|---|
| 0 | 000 | 0 |
| 1 | 001 | 2 |
| 2 | 010 | 3 |
| 3 | 011 | 4 |
| 4 | 100 | 6 |
| 5 | 101 | 8 |
| 6 | 110 | 9 |
| 7 | 111 | 10 |

FIG. 5

| combined_cyclicShift_mf_grantless in RRC | Cyclic shift in RRC $(n^{(1)}_{DMRS}+n^{(2)}_{DMRS,\lambda})$ | | | | $\left[w^{(\lambda)}(0) \quad w^{(\lambda)}(1)\right]$ | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 00000 | 0 | 6 | 3 | 9 | [1 −1] | [1 −1] | [1 1] | [1 1] |
| 00001 | 0 | 6 | 3 | 9 | [1 1] | [1 1] | [1 1] | [1 1] |
| 00010 | 6 | 0 | 9 | 3 | [1 −1] | [1 −1] | [1 1] | [1 1] |
| 00011 | 6 | 0 | 9 | 3 | [1 1] | [1 1] | [1 1] | [1 1] |
| 00100 | 3 | 9 | 6 | 0 | [1 −1] | [1 −1] | [1 1] | [1 1] |
| 00101 | 3 | 9 | 6 | 0 | [1 1] | [1 1] | [1 1] | [1 1] |
| 00110 | 9 | 3 | 0 | 6 | [1 −1] | [1 −1] | [1 1] | [1 1] |
| 00111 | 9 | 3 | 0 | 6 | [1 1] | [1 1] | [1 1] | [1 1] |
| 01000 | 1 | 7 | 4 | 10 | [1 −1] | [1 −1] | [1 1] | [1 1] |
| 01001 | 1 | 7 | 4 | 10 | [1 1] | [1 1] | [1 1] | [1 1] |
| 01010 | 7 | 1 | 10 | 4 | [1 −1] | [1 −1] | [1 1] | [1 1] |
| 01011 | 7 | 1 | 10 | 4 | [1 1] | [1 1] | [1 1] | [1 1] |
| 01100 | 4 | 10 | 7 | 1 | [1 −1] | [1 −1] | [1 1] | [1 1] |
| 01101 | 4 | 10 | 7 | 1 | [1 1] | [1 1] | [1 1] | [1 1] |
| 01110 | 10 | 4 | 1 | 7 | [1 −1] | [1 −1] | [1 1] | [1 1] |
| 01111 | 10 | 4 | 1 | 7 | [1 1] | [1 1] | [1 1] | [1 1] |
| 10000 | 2 | 8 | 5 | 11 | [1 −1] | [1 −1] | [1 1] | [1 1] |
| 10001 | 2 | 8 | 5 | 11 | [1 1] | [1 1] | [1 1] | [1 1] |
| 10010 | 8 | 2 | 11 | 5 | [1 −1] | [1 −1] | [1 1] | [1 1] |
| 10011 | 8 | 2 | 11 | 5 | [1 1] | [1 1] | [1 1] | [1 1] |
| 10100 | 5 | 11 | 8 | 2 | [1 −1] | [1 −1] | [1 1] | [1 1] |
| 10101 | 5 | 11 | 8 | 2 | [1 1] | [1 1] | [1 1] | [1 1] |
| 10110 | 11 | 5 | 2 | 8 | [1 −1] | [1 −1] | [1 1] | [1 1] |
| 10111 | 11 | 5 | 2 | 8 | [1 1] | [1 1] | [1 1] | [1 1] |

FIG. 6

CONFIGURATION OF GRANT-LESS UPLINK TRANSMISSIONS FOR A USER EQUIPMENT

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIGS. 2A and 2B illustrate an offset unit frame for a first single-carrier frequency-division multiple access (SC-FDMA) symbol in a grant less uplink (GUL) transmission in accordance with an example;

FIG. 3 is a table of a mapping of selfDefer_mf to self-defer offsets for frequency division multiplexed grant less uplink (GUL) transmission user equipment (UEs) in accordance with an example;

FIG. 4 is a table of a mapping of cyclic shift fields in uplink-related downlink control information (DCI) format or most significant bit (MSB) 3 bits of cyclicShift_mf_grantless to $n_{DMRS,\lambda}^{(2)}$ and $[w^{(\lambda)}(0)\ w^{(\lambda)}(1)]$ in accordance with an example;

FIG. 5 is a table of a mapping of cyclicShift or a least significant bit (LSB) 3 bits of cyclicShift_mf_grantless to n s values in accordance with an example;

FIG. 6 is a table of a mapping of 5 bits combined_cyclicShift_mf_grantless in radio resource control (RRC) to cyclic shifts in RRC and $[w^{(\lambda)}(0)\ w^{(\lambda)}(1)]$ in accordance with an example;

Figure 1A:
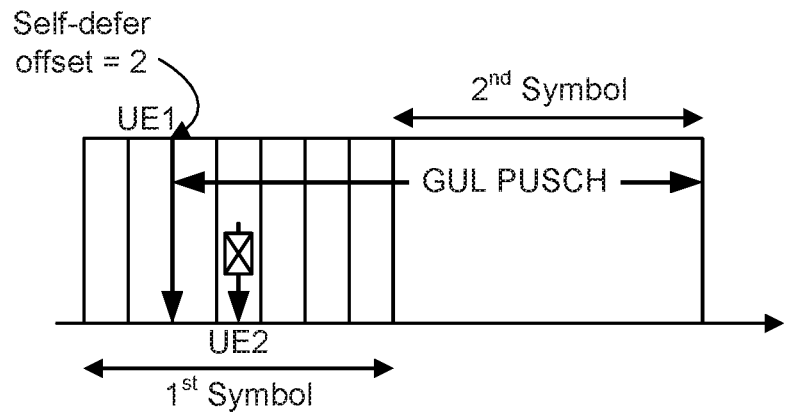
FIG. 1A illustrates a time division multiplexing (TDM) random offset in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Due to the popularity of mobile and smart devices, the recent widespread adoption of wireless broadband has resulted in a tremendous growth in the volume of mobile data traffic, and has radically changed system design specifications. For instance, while it has become critical to lower complexity, elongate battery life, and support highly mobility and service continuity of devices, increased data rates and bandwidth, and reduced latency are also important to support modem applications.

To meet the challenges of future wireless networks, several physical layer techniques have been introduced in recent years (e.g., multiple-input multiple-output (MIMO) techniques, enhanced inter-cell interference coordination (ICIC) and coordinated multi-point designs, etc.). In addition, an increasing interest has risen in operating cellular networks in the unlicensed spectrum to cope with scarcity of the licensed spectrum in low frequency bands with the aim of further improving data rates.

One major enhancement for LTE in 3GPP Release 13 has been to enable its operation in the unlicensed spectrum via Licensed-Assisted Access (LAA), which can expand the system bandwidth by utilizing the flexible carrier aggregation (CA) framework introduced by the LTE-Advanced system. Enhanced operation of LTE systems in the unlicensed spectrum is also expected in 5G systems. Potential LTE operation in the unlicensed spectrum includes, but not limited to, Carrier Aggregation based licensed assisted access (LAA) or enhanced LAA (eLAA) systems, LTE operation in the unlicensed spectrum via dual connectivity (DC), and a standalone LTE system in the unlicensed spectrum, where LTE-based technology solely operates in the unlicensed spectrum without necessitating an "anchor" in licensed spectrum—a system that is referred to as MulteFire. MulteFire can combine the performance benefits of LTE technology with the simplicity of Wi-Fi-like deployments, and is envisioned as an important technology component to meet the ever-increasing wireless traffic.

Design for Grant Less DCI for Different TB Configurations

In one example, since an uplink performance can be limited in eLAA due to listen before talk (LBT) being performed at both a UE and an eNodeB, a grant-less uplink (GUL) transmission (GUL) can be used. A maximum channel occupancy time (MCOT) acquired by the UE for GUL transmission can be shared with the eNodeB to enable a faster hybrid automatic repeat request (HARQ) procedure and improved downlink/uplink performance. Therefore, the eNodeB is to have information about the MCOT and a GUL burst length to determine subframes available for sharing.

In one example, grant less downlink control information (G-DCI) can include an uplink (UL) HARQ acknowledgement/negative acknowledgement (ACK/NACK) bitmap, which can include the HARQ-ACK of configured GUL HARQ identifiers (IDs). The G-DCI can be UE-specific. The G-DCI can reuse a length of an existing DCI format. For format 0A/1A, a maximum HARQ number for a GUL transmission with rank-2 can be 14. Here, either one transport block or two transport blocks can be used to transmit the G-DCI. However, the UE receives the G-DCI as a bit string (e.g., either 0 or 1), so it can be difficult for the UE to distinguish and interpret a bit field. Therefore, as described in further detail below, a DCI format can be used that enables dynamic transport block (TB) scaling and correct interpretation by the UE.

In one example, to resolve the confusion of content in G-DCI in one or two TBs, a novel bit field interpretation is described. In contrast to the legacy scheduling system, in which one DCI corresponds to one physical uplink shared channel (PUSCH), in the present technology, one DCI can trigger multiple PUSCH subframe transmissions. In addition, a timing association of content in the G-DCI and activation/release DCI is further described below.

In one example, TB determination can be based on a radio resource control (RRC) configuration or activation/release DCI. For example, a rank indication or maximum TB number can be configured by an eNodeB via RRC signaling or based on the activation/release DCI.

In one configuration, for one transport block, the bit field can be interpreted sequentially according to a flag that differentiates between G-DCI and grant less activation/release DCI. The flag can be 1 bit, where a value of '0' can indicate G-DCI and a value of '1' can indicate grant less activation/release DCI. The G-DCI can be for acknowledgement (ACK) or negative ACK (NACK) for a grant less transmission (Tx), whereas the grant less activation/release DCI can be DCI to activate or release a grant less feature.

In one example, when the format 0A is used for G-DCI, 2 bits can be used for a transmit power control (TPC) command for grant less PUSCH, as defined in Section 5.1.1.1 of MulteFire Alliance (MFA) Technical Specification (TS) 36.213. Further, when format 0A is used for G-DCI, a HARQ-ACK bitmap can be included in the G-DCI, where a number of bits for the HARQ-ACK bitmap can be specified by RRC signaling, and 5 bits can be used for a modulation and coding scheme (MCS) and redundancy version, as defined in Section 8.6 of MFA TS 36.213. Further, when format 0A is used for G-DCI, precoding information and a number of multiple-input multiple-output (MIMO) layers (e.g., two layers can indicate that two data are transmitted at the same time by different antennas) can be included in the G-DCI, where a number of bits for this information can be specified in Table 5.3.3.1.8-1 of MFA 36.212. The bit field can be shown in Table 5.3.3.1.8-2 and Table 5.3.3.1.8-3 of MFA 36.212.

In one example, a transmitted precoding matrix indicator (TPMI) for 2 antenna ports can indicate which codebook index is to be used in Table 5.3.3A.2-1 of MFA TS 36.212, and a TPMI for 4 antenna ports can indicate which codebook index is to be used in Table 5.3.3A.2-2, Table 5.3.3A.2-3, Table 5.3.3A.2-4 and Table 5.3.3A.2-5 of MFA TS 36.212.

In one example, in a single transport blocks case, a transport block to codeword mapping can be specified according to Table 5.3.3.1.5-2 of MFA 36.212. For a single enabled codeword, indices 24 to 39 in Table 5.3.3.1.8-3 of MFA 36.212 can be supported for retransmission of a corresponding transport block when that transport block has previously been transmitted using two layers.

In one configuration, for two transport blocks, the bit field can be interpreted sequentially according to a flag that differentiates between G-DCI and grant less activation/release DCI. The flag can be 1 bit, where a value of '0' can indicate G-DCI and a value of '1' can indicate grant less activation/release DCI.

In one example, when the format 0A is used for G-DCI, 2 bits can be used for a TPC command for grant less PUSCH, as defined in Section 5.1.1.1 of MFA TS 36.213. Further, when format 0A is used for G-DCI, a 2*HARQ-ACK bitmap can be included in the G-DCI, where a number of bits for the 2*HARQ-ACK bitmap can be equal to assigned grant less PUSCH HARQ process numbers, the 2*HARQ-ACK bitmap can be specified by RRC signaling. Further, when format 0A is used for G-DCI, 5 bits can be used for a MCS and redundancy version of transport block 1 (TB1) and 5 bits can be used for a MCS and redundancy version of transport block 2 (TB2), as defined in Section 8.6 of MFA TS 36.213. Further, when format 0A is used for G-DCI, precoding information and a number of layers can be included in the G-DCI, where a number of bits for this information can be specified in Table 5.3.3.1.8-1 of MFA 36.212. The bit field can be shown in Table 5.3.3.1.8-2 and Table 5.3.3.1.8-3 of MFA 36.212.

In one example, a TMPI for 2 antenna ports can indicate which codebook index is to be used in Table 5.3.3A.2-1 of MFA TS 36.212, and a TPMI for 4 antenna ports can indicate which codebook index is to be used in Table 5.3.3A.2-2, Table 5.3.3A.2-3, Table 5.3.3A.2-4 and Table 5.3.3A.2-5 of MFA TS 36.212.

In one example, when both transport blocks are enabled, TB1 can be mapped to codeword 0 and T2 can be mapped to codeword 1. When one of the transport blocks is disabled, the transport block to codeword mapping can be specified according to Table 5.3.3.1.5-2 of MFA 36.212. For a single enabled codeword, indices 24 to 39 in Table 5.3.3.1.8-3 of MFA 36.212 can be supported for retransmission of the corresponding transport block when that transport block has previously been transmitted using two layers.

In one example, a position between the HARQ-ACK bitmap and the MCS and redundancy version can be switched.

In one configuration, a TB configuration can be dynamically indicated by G-DCI. In one example, a flag can be added before an MCS and bitmap to indicate a one-TB G-DCI or a two-TB G-DCI. In this case, a value of '0' can indicate the one-TB G-DCI and a value of '1' can indicate the two-TB G-DCI. Further, 1 bit can be used for a flag that differentiates between G-DCI and grant less activation/release DCI, and 2 bits can be used for a TPC command for grant less PUSCH. For one-TB G-DCI, 5 bits can be used for a MCS, 0/3/6 bits can be used for precoding information and a number of layers according to an antenna configuration, and a HARQ-ACK bitmap can be included in the G-DCI. For two-TB G-DCI, 5 bits can be used for a MCS for TB1, 5 bits can be used for a MCS for TB2, 0/3/6 bits can be used for precoding information and a number of layers according to an antenna configuration, and a 2*HARQ-ACK bitmap can be included in the G-DCI.

In one example, a TB number can be distinguished by a special MCS configuration, where MCS=29 can be utilized for disabling one TB. In this example, a 1-bit flag can be used for differentiating between G-DCI and grant less activation/release DCI, where a value of '0' can indicate G-DCI and a value of '1' can indicate grant less activation/release DCI. Further, 2 bits can be used for a TPC command for grant less PUSCH, 5 bits can be used for a MCS and redundancy version of TB1 and 5 bits can be used for a MCS and redundancy version of TB2, as defined in Section 8.6 of MFA TS 36.213. However, when the MCS is equal to 29, TB2 can be disabled. Further, a HARQ-ACK bitmap can be used, where a bitmap length is equal to $N_{GUL,HARQ}$ for one TB, $2*N_{GUL,HARQ}$ for two TBs, respectively, where $N_{GUL,HARQ}$ is a number of configured HARQ processes for a grant less transmission. Further, precoding information and a number of layers can be included in the G-DCI, where a number of bits for this information can be specified in Table 5.3.3.1.8-1 of MFA 36.212. The bit field can be shown in Table 5.3.3.1.8-2 and Table 5.3.3.1.8-3 of MFA 36.212.

In one example, a TPMI for 2 antenna ports can indicate which codebook index is to be used in Table 5.3.3A.2-1 of MFA TS 36.212, and a TPMI for 4 antenna ports can indicate which codebook index is to be used in Table 5.3.3A.2-2, Table 5.3.3A.2-3, Table 5.3.3A.2-4 and Table 5.3.3A.2-5 of MFA TS 36.212. If both transport blocks are enabled, TB1 can be mapped to codeword 0 and TB2 can be mapped to codeword 1. When one of the transport blocks is disabled, the transport block to codeword mapping can be specified according to Table 5.3.3.1.5-2 of MFA 36.212. For a single enabled codeword, indices 24 to 39 in Table 5.3.3.1.8-3 of MFA 36.212 can be supported for retransmission of a corresponding transport block when that transport block has previously been transmitted using two layers.

In one configuration, with respect to a dynamic transport block configuration through activation/release DCI for grant less transmission, a TB number of a GUL transmission can be indicated by activation/release DCI. In a first option, an indication can be used, e.g., a value of '0' can correspond to a one-TB GUL transmission and a value of '1' can correspond to a two-TB GUL transmission. In a second option, a two MCS bit field can be used. For example, when the MCS of the second TB is set to be 29, the second TB can be disabled, and the activation/release DCI and G-DCI can only include one-TB information. Otherwise, the activation/release DCI can include two-TB information.

In one example, one or multiple elements can be contained in the activation/release DCI. For example, 1 bit can be used for a flag to distinguish between G-DCI and activation/release DCI. Further, 10 bits can be used for a MCS, where 5 bits can be used for each of the two TBs. Alternatively, with respect to the MCS, 6 bits can be used for one TB, and 11 bits can be used for two TBs. Further, 0/3/6 bits can be used for a precoding matrix indicator (PMI) depending on 1/2/4 antennas, 6 bits can be used for resource allocation, which can support dynamic switching between a full band GUL mode and a non-full band GUL mode, 3 bits can be used to indicate a UE-specific start position, 4 bits can be used for a grant less HARQ number to support a dynamic HARQ configuration for a GUL transmission and/or 10 bits can be used as validation bits, e.g., all '0's can indicate activation and all '1's can indicate a release, or vice versa.

In one configuration, with respect to activation timing of content in G-DCI or activation/release DCI, a TPC filed/MCS/PMI in G-DCI can be applied on GUL subframes, which can be transmitted four subframes later than a G-DCI subframe, and a TPC filed/MCS/PMI in activation/release DCI can be applied on corresponding triggered GUL subframes.

In one configuration, a UE can receive grant less downlink control information (G-DCI) from an eNodeB in a MulteFire system. The UE can identify grant less uplink DCI components included in the G-DCI. The UE can perform a grant less uplink transmission with the eNodeB based on the grant less uplink DCI components in the G-DCI received from the eNodeB. In one example, the G-DCI can be a grant less activation/release DCI, wherein the G-DCI can be for acknowledgement (ACK) or negative ACK (NACK) for a grant less transmission (Tx), wherein the grant less activation/release DCI can be DCI to activate or release a grant less feature.

In one example, the G-DCI can include a bit field with a flag that differentiates the G-DCI as corresponding to G-DCI or grant less activation/release DCI. In another example, the grant less activation/release DCI can include a maximum transport block (TB) number configuration from the gNB. In yet another example, the grant less activation/release DCI can include a two modulation and coding scheme (MCS) field, wherein an MCS of a second transport block (TB) can be set to 29 indicating that the second TB is disabled and the grant less activation/release DCI corresponds to one TB information, or the grant less activation/release DCI can correspond to two TB information.

In one example, the G-DCI can include a transmit power control (TPC) command for a grant less physical uplink shared channel (PUSCH), where the TPC command can be provided using two bits. The G-DCI can include hybrid automatic repeat request acknowledgement (HARQ-ACK) bitmap(s), where a number of the HARQ-ACK bitmap(s) can be equal to an assigned grant less PUSCH HARQ process number that is specified via radio resource control (RRC) signaling. The G-DCI can include a modulation and coding scheme (MCS) and redundancy version of a first transport block (TB1) using five bits. The G-DCI can include an MCS and redundancy version of a second transport block (TB2) using five bits. In addition, the G-DCI can include precoding information and a number of multiple-input multiple-output (MIMO) layers.

In one example, the G-DCI can include one or more of a transmit power control (TPC) field, a modulation and coding scheme (MCS) or a precoding matrix indicator (PMI), where the one or more of the TPC field, the MCS or the PMI can be applied on a grant less uplink (GUL) subframe that is transmitted four subframes after a G-DCI subframe. In addition, the G-DCI can be UE-specific and corresponds to format 0A/1A.

TDM and FDM Mode Switching and DMRS Configuration for GUL

In one example, schedule based uplink transmissions can limit uplink throughput due to double listen before talk (LBT) procedures at both the eNodeB and the UE. Therefore, grant-less uplink (GUL) transmissions can be used, where the UE can autonomously initialize uplink transmissions without a grant from a serving eNB. Since the LBT can be completed in any instant within a subframe, the UE can self-defer its transmission to a next subframe/slot boundary to have a subframe aligned with that of a primary cell (PCell).

In one example, GUL transmissions can support both a time division multiplexing (TDM) mode and a frequency division multiplexing (FDM) mode. To enable flexible switching between the TDM mode and the FDM mode, the eNodeB can control the TDM/FDM mode of all UEs corresponding to the eNodeB. Besides an indication of the TDM/FDM mode, the eNodeB can inform a target UE of related information, which can include a resource allocation (RA). A GUL UE can occupy a full frequency band in TDM mode, while in FDM mode the GUL UE can utilize a partial frequency resource, which can be allocated and indicated by the eNodeB. Further, the related information can include a self-defer offset. In the TDM mode, each UE can have a different starting offset for collision avoidance, which can be randomly selected by the UE. However, in the FDM mode, all of the uplink transmissions should start at the same time, which means that the eNodeB should inform the same start offset to all UEs.

In one example, DMRS information can be configured through radio resource control (RRC) signaling in a Multe-Fire (MF) GUL transmission, which is different than the legacy LTE design.

In one example, a mechanism for indicating the TDM/FDM mode for a GUL UE and the related information, such as the resource allocation and the starting offset (or self-defer offset) for frequency division multiplexed UEs, as well as a mechanism for indicating a DMRS configuration, is described in further detail below. In other words, an indication mechanism is described for the DMRS configuration and for GUL mode switching between TDM and FDM, along with the related information, such as the resource allocation and self-defer offset for a GUL UE in a MF system.

In one example, to enable GUL transmissions and mode switching between TDM and FDM in a MF cell, an indication of a DMRS configuration, a TDM/FDM mode and related information can be transmitted from the eNodeB to the UE. A design of a single-carrier frequency-division multiple access (SC-FDMA) symbol with a self-defer offset, an indication of TDM/FDM mode switching for a GUL UE, an indication for resource allocation and the self-defer offset with respect to a frequency division multiplexed GUL UE, and an indication of a DMRS configuration in RRC are further described in detail below.

In one example, a GUL transmission can enable a UE to perform an uplink transmission without eNodeB scheduling, as long as the UE uses a channel via LBT. In order to maintain an aligned relationship between a GUL subframe and a PCell subframe, a self-defer offset can be adopted, which can have an impact on signal generation.

In one example, to puncture samples of SC-FDMA symbol #0 in a GUL transmission with a self-defer offset, a signal generation $s_l^{(p)}(t), l=0$ can be given by $$s_0^{(p)}(t) = \begin{cases} 0 & 0 \le t < N_{start}^{GUL}T_s \\ -s_1^{(p)}(t - N_{CP,0}T_s) & N_{start}^{GUL}T_s \le t < (N_{CP,0}+N)T_s \end{cases},$$

where $T_s$ seconds is a basic time unit, and $N_{start}^{GUL}$ indicates a starting position of a GUL transmission (expressed as a number of samples). In this case, the samples before $N_{start}^{GUL}$ can be set to 0 and the samples after $N_{start}^{GUL}$ in the SC-FDMA symbol #0 can be used as an extension cyclic prefix (CP) of SC-FDMA symbol #1. The value of $N_{start}^{GUL}$ can depend on the self-defer offset, which can have different regulation restrictions under different modes.

In one example, in a TDM GUL configuration, to avoid an access collision in which more than one UE has finished LBT and defers a GUL transmission to a next subframe, each UE can randomly select a starting offset, such that the UE with a small offset has priority over other UE(s). However, in the FDM case, the eNodeB can configure all frequency division multiplexed GUL UEs with a same starting offset that is to be selected from a UE specific offset for time division multiplexed GUL UEs. In this case, the UE can be informed of the self-defer offset, as well as the resource assigned to the self-defer offset.

Figure 1B:
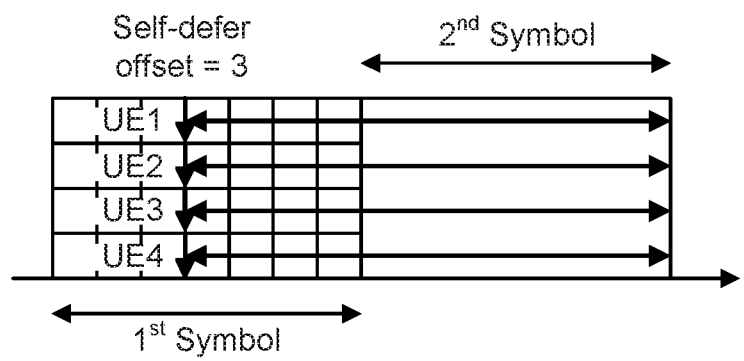
FIG. 1B illustrates a frequency division multiplexing (FDM) fixed offset in accordance with an example.

FIGS. 1A and 1B illustrate a TDM random offset and an FDM fixed offset, respectively. In this example, for the TDM random offset, a self-defer offset can be set to 2, and two separate UEs can perform a GUL transmission over a GUL PUSCH in the time domain. In this example, for the FDM fixed offset, the self-defer offset can be set to 3, and four separate UEs can perform a GUL transmission over the GUL PUSCH in the frequency domain.

In one configuration, with respect to a self-defer offset indication for a FDM UE, each self-defer offset unit can be $t_{offset\_unit}=9$ us. The offset unit can also be expressed as $n_{sample}^{offset\_unit} T_s$, where $n_{sample}^{offset\_unit}=277$ indicates a number of samples in one offset unit. Since a length of a first SC-FDMA symbol with normal CP is $(160+2048) T_s=2208T_s\approx71.91$ us, there could be $N_{offset\_unit}^{max}=7$ complete offset units and approximately $t_{remain}=8.91$ us→$n_{sample}^{remain}$=remaining.

FIGS. 2A and 2B illustrate an offset unit frame for a first SC-FDMA symbol in a GUL transmission. As shown in FIG. 2A, remaining samples can be before offset unit(s), and as shown in FIG. 2B, remaining samples can be after offset unit(s).

In one example, when the self-defer offset of a GUL UE is x, the GUL transmission can start from the end of $x^{th}$ offset unit(s) and an absolute starting time can depend on an arrangement of symbol #0. In other words, the self-defer offset can be expressed as a number of offset units. Furthermore, a GUL transmission can start from an end of a random offset for time division multiplexed UEs or an indicated offset for frequency division multiplexed UEs.

For example, an SC-FDMA symbol #0 of a first GUL subframe can be arranged as $N_{offset\_unit}^{max} n_{sample}^{offset\_unit} + n_{sample}^{remain}$, where $n_{sample}^{remain}$ is behind $N_{offset\_unit}^{max} n_{sample}^{offset\_unit}$, as shown in FIG. 2B, or the SC-FDMA symbol #0 of the first GUL subframe can be arranged as $N_{sample}^{remain} + N_{offset\_unit}^{max} n_{sample}^{offset\_unit}$, where $n_{sample}^{remain}$ is before $N_{offset\_unit}^{max} n_{sample}^{offset\_unit}$, as shown in FIG. 2A. In this case, the eNodeB can give a higher priority to GUL UEs by configuring an offset smaller than $n_{sample}^{remain} T_s$ to GUL UEs.

In one example, the starting position of the GUL can depend on an arrangement of offset units $n_{sample}^{offset\_unit}$ and remaining samples $n_{sample}^{remain}$ in the first symbol. For example, when the SC-FDMA symbol #0 of the first GUL subframe can be arranged as $N_{offset\_unit}^{max} n_{sample}^{offset\_unit} + n_{sample}^{remain}$, where $n_{sample}^{remain}$ is behind $N_{offset\_unit}^{max} n_{sample}^{offset\_unit}$, then the starting position can be obtained by $N_{start}^{GUL} = n_{offset\_unit} n_{sample}^{offset\_unit}$. In another example, when the SC-FDMA symbol #0 of the first GUL subframe can be arranged as $N_{offset\_unit}^{max} n_{sample}^{offset\_unit} + n_{sample}^{remain}$, where $n_{sample}^{remain}$ is before $N_{offset\_unit}^{max} n_{sample}^{offset\_unit}$, then the starting position can be calculated by $N_{start}^{GUL} = n_{sample}^{remain} + n_{offset\_unit} n_{sample}^{offset\_unit}$.

In one example, a self-defer offset $n_{offset\_unit}^{TDM}$ for a time division multiplexed UE can be randomly selected from [0,7] ($N_{offset\_unit}^{max} = 7$) and an offset $n_{offset\_unit}^{FDM}$ for a frequency division multiplexed UE can be indicated by a serving cell ranging from [0, 7]. In other words, a number for the self-defer offset, i.e., $n_{offset\_unit}$, can range from 0 to $N_{offset\_unit}^{max}$ ($N_{offset\_unit}^{max} = 7$). Moreover, $n_{offset\_unit} = n_{offset\_unit}^{TDM}$ for a time division multiplexed GUL UE, where $n_{offset\_unit}^{TDM}$ can be randomly selected by the UE, and $n_{offset\_unit} = n_{offset\_unit}^{FDM}$ for a frequency division multiplexed GUL UE, where $n_{offset\_unit}^{FDM}$ can be indicated by the serving eNodeB. Then, the starting position of a GUL transmission can be determined as follows:

$$N_{start}^{GUL} = \begin{cases} n_{sample}^{remain} = 269 & n_{offset\_unit} = 0 \\ n_{sample}^{remain} + n_{sample}^{offset\_unit} = 546 & n_{offset\_unit} = 1 \\ n_{sample}^{remain} + 2n_{sample}^{offset\_unit} = 823 & n_{offset\_unit} = 2 \\ n_{sample}^{remain} + 3n_{sample}^{offset\_unit} = 1100 & n_{offset\_unit} = 3 \\ n_{sample}^{remain} + 4n_{sample}^{offset\_unit} = 1377 & n_{offset\_unit} = 4 \\ n_{sample}^{remain} + 5n_{sample}^{offset\_unit} = 1654 & n_{offset\_unit} = 5 \\ n_{sample}^{remain} + 6n_{sample}^{offset\_unit} = 1931 & n_{offset\_unit} = 6 \\ n_{sample}^{remain} + 7n_{sample}^{offset\_unit} = 2208 & n_{offset\_unit} = 7 \end{cases}$$

for FIG. 2A, or $$N_{start}^{GUL} = \begin{cases} 0 & n_{offset\_unit} = 0 \\ n_{sample}^{offset\_unit} = 277 & n_{offset\_unit} = 1 \\ 2n_{sample}^{offset\_unit} = 554 & n_{offset\_unit} = 2 \\ 3n_{sample}^{offset\_unit} = 831 & n_{offset\_unit} = 3 \\ 4n_{sample}^{offset\_unit} = 1108 & n_{offset\_unit} = 4 \\ 5n_{sample}^{offset\_unit} = 1385 & n_{offset\_unit} = 5 \\ 6n_{sample}^{offset\_unit} = 1662 & n_{offset\_unit} = 6 \\ 7n_{sample}^{offset\_unit} = 1939 & n_{offset\_unit} = 7 \end{cases}$$

for FIG. 2B, where $n_{offset\_unit}$ is a number of self-defer offset unit(s).

FIG. 3 is an exemplary table of a mapping of selfDefer_mf to self-defer offsets for frequency division multiplexed GUL UEs. For frequency division multiplexed GUL UEs, a value of $n_{offset\_unit}^{FDM}$ can be indicated using a 3-bit parameter, referred to as selfDefer_mf. In this example, 3 bits can be used to indicate a starting position for FDM GUL UEs.

In one example, fewer than 3 bits can be utilized to indicate values with assistance of higher layer configured starting position values, e.g., 2 bits for higher layer configured starting position values {0, 2, 4, 7}.

In one configuration, with respect to an indication of TDM/FDM switching, when a UE is configured for the TDM mode, the UE can use a full band for a GUL transmission. Alternatively, when the UE is configured for the FDM mode, the UE can use a partial resource, which can be allocated and indicated by a serving eNodeB.

In one example, the TDM/FDM mode can be implicitly indicated via a special configuration of resource allocation (RA). For example, when the RA configures a full band resource to the UE, that UE can be configured for the TDM mode. Alternatively, when the RA configures a partial frequency resource to the UE, then the UE can be configured for the FDM mode and the UE can use the allocated resource. Meanwhile, the self-defer offset can also be indicated by the eNodeB.

In one example, the RA can be indicated in grant less PUSCH activation/release DCI or via high layer signaling. In another example, the self-defer offset can be indicated in grant less PUSCH activation/release DCI or via high layer signaling. In yet another example, the RA and the self-defer offset can be configured via RRC irrespective of whether the target GUL UE is configured for TDM mode or FDM mode. In addition, a 1-bit TDM/FDM mode flag can be indicated in the activation/release DCI. Once the UE switches to FDM mode, the UE can use the configuration in RRC including the RA and self-defer offset. Otherwise, the UE can use the full band to perform a GUL transmission and randomly select a starting offset.

In one example, with respect to a demodulation reference signal (DMRS) configuration, in legacy LTE, a cyclic shift can be determined using two parts: (1) $n_{DMRS}^{(1)}$ is given by a parameter cyclicShift that is provided by higher layers according to Table 5.5.2.1.1-2 in MFA TS 36.211; and (2) $n_{DMRS,\lambda}^{(2)}$, as well as orthogonal cover code (OCC) information, as given by Table 5.5.2.1.1-1 in MFA TS 36.211 using a cyclic shift field in a most recent uplink-related DCI.

However, for a MF GUL transmission, DMRS configuration information can be configured via RRC using a novel RRC information element (IE), thereby leading to a redesign of the DMRS indication. Thus, in the present technology, the DMRS information including $n_{DMRS}^{(1)}$, $n_{DMRS,\lambda}^{(2)}$ and OCC can be configured via RRC.

In one example, 6-bit DMRS information, referred to as cyclicShift_mf_grantless, can be included in RRC to separately indicate $n_{DMRS}^{(1)}$, and $n_{DMRS,\lambda}^{(2)}$ as the legacy LTE, where the least significant bit (LSB) 3 bits can be used to indicate the value of $n_{DMRS}^{(1)}$ and the most significant bit (MSB) 3 bits can be used to indicate the value of $n_{DMRS,\lambda}^{(2)}$ and OCC configuration.

In one example, the bits used to indicate $n_{DMRS}^{(1)}$ or $n_{DMRS,\lambda}^{(2)}$ are not limited as the aforementioned form. For example, a 1st, 3rd, or 5th bit can be used to indicate $n_{DMRS}^{(1)}$ and a 2nd, 4th, or 6th bit to indicate $n_{DMRS,\lambda}^{(2)}$ and the OCC.

FIG. 4 is an exemplary table of a mapping of cyclic shift fields in uplink-related DCI format or MSB 3 bits of cyclicShift_mf_grantless to $n_{DMRS,\lambda}^{(2)}$ and $[w^{(\lambda)}(0) \, w^{(\lambda)}(1)]$.

In this example, the MSB 3 bits out of the 6-bit DMRS information, referred to as cyclicShift_mf_grantless, can be used to indicate the value of $n_{DMRS,\lambda}^{(2)}$ and OCC configuration.

FIG. 5 is an exemplary table of a mapping of cyclicShift or LSB 3 bits of cyclicShift_mf_grantless to $n_{DMRS}^{(1)}$ values. In this example, the LSB 3 bits out of the 6-bit DMRS information, referred to as cyclicShift_mf_grantless, can be used to indicate the value of $n_{DMRS}^{(1)}$.

In one example, the DMRS configuration can be separately indicated through two higher-layer parameters via RRC. A first parameter can be used to indicate $n_{DMRS}^{(1)}$, which can reuse a legacy LTE design, e.g., a 3-bit cyclicShift to provide a value of $n_{DMRS}^{(1)}$ according to Table 5.5.2.1.1-2 in MFA TS 36.211. A second parameter, referred to as cyclicShiftAndOCC_mf_grantless, can be used in RRC to indicate $n_{DMRS,\lambda}^{(2)}$ and an OCC configuration for a MF grant less transmission using a same mapping method as Table 5.5.2.1.1-1 in MFA TS 36.211. The second parameter can be defined as a bit string type with 3 bits length, which can resemble a cyclic shift field in uplink-related DCI. Thus, the second parameter can take the place of the cyclic shift field in the uplink-related DCI.

In one example, the DMRS configuration indicated via RRC signalling can include $n_{DMRS}^{(1)}$ and $n_{DMRS,\lambda}^{(2)}$, where $n_{DMRS}^{(1)}$ and $n_{DMRS,\lambda}^{(2)}$ represent two DMRS parameters for a cyclic shift and an OCC, respectively. In addition, LSB 3 bits can be used to indicate a value of $n_{DMRS}^{(1)}$ and MSB 3 bits can be used to indicate a value of $n_{DMRS,\lambda}^{(2)}$ and an OCC configuration.

FIG. 6 is an exemplary table of a mapping of 5 bits combined_cyclicShift_mf_grantless in RRC to cyclic shifts in RRC and $[w^{(\lambda)}(0)\ w^{(\lambda)}(1)]$. In this example, 5-bit DMRS information, referred to as combined_cyclicShift_mf_grantless, can be used in RRC to jointly indicate a combination of the cyclic shift and OCC. Alternatively, 5 bits can used to configure the DMRS information, where 1 bit can be used to indicate an OCC type and 4 bits can be used to indicates a cyclic shift configuration (from 12 cyclic shifts).

In one configuration, an eNodeB can identify a mode switching indicator related to switching between a frequency division multiplexing (FDM) mode and a time division multiplexing (TDM) mode for a UE in a MulteFire system. The eNodeB can determine a resource allocation (RA) for the UE. The eNodeB can select a self-defer offset for the UE, wherein the self-defer offset indicates a starting position for a GUL transmission from the UE operating in the FDM mode or the TDM mode. The eNodeB can select a demodulation reference signal (DMRS) configuration for the GUL transmission from the UE. The eNodeB can transmit the mode switching indicator, the RA, the self-defer offset and the DMRS configuration to the UE.

In one example, the mode switching indicator can include three bits to indicate the starting position for the GUL transmission when the UE operates in the FDM mode. In another example, the FDM mode or the TDM mode can be implicitly indicated by the eNodeB via a special configuration of the RA. In yet another example, the eNodeB can transmit the RA to the UE via grant less physical uplink shared channel (PUSCH) activation/release downlink control information (DCI). In a further example, the eNodeB can transmit the self-defer offset to the UE via higher layer signaling. In yet a further example, the DMRS configuration for the GUL transmission can be indicated by the eNodeB via radio resource control (RRC) signaling and the DMRS configuration can include $n_{DMRS}^{(1)}$ and $n_{DMRS,\lambda}^{(2)}$, where $n_{DMRS}^{(1)}$ and $n_{DMRS,\lambda}^{(2)}$ represent two DMRS parameters for a cyclic shift and an orthogonal cover code (OCC), and least significant bit (LSB) 3 bits are used to indicate a value of $n_{DMRS}^{(1)}$ and most significant bit (MSB) 3 bits are used to indicate a value of $n_{DMRS,\lambda}^{(2)}$ and an OCC configuration.

Figure 7:
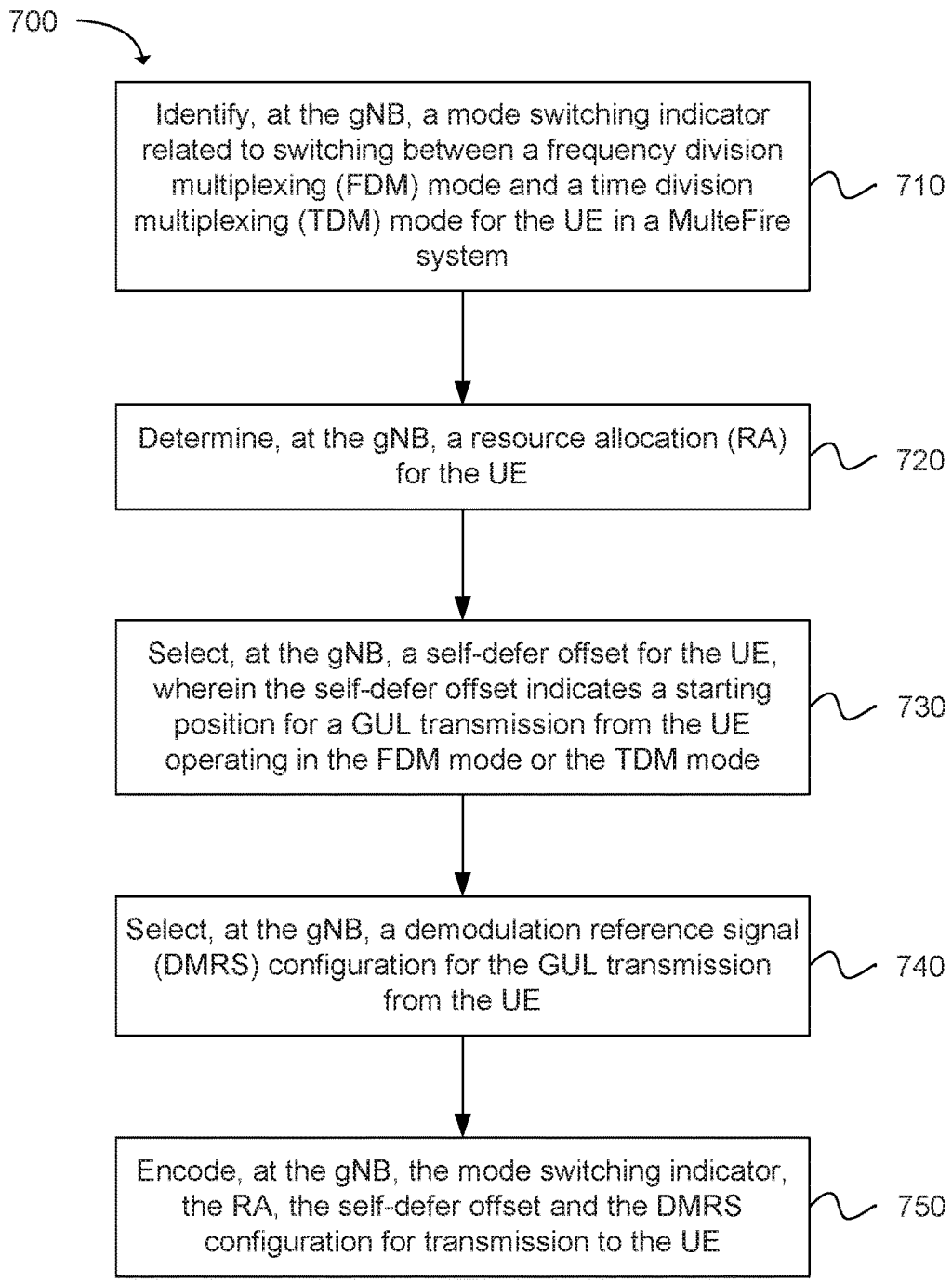
FIG. 7 depicts functionality of a Next Generation NodeB (gNB) operable to configure a user equipment (UE) for grant less uplink (GUL) transmissions to the gNB in accordance with an example.

Another example provides functionality 700 of a Next Generation NodeB (gNB) operable to configure a user equipment (UE) for grant less uplink (GUL) transmissions to the gNB, as shown in FIG. 7. The gNB can comprise one or more processors configured to identify, at the gNB, a mode switching indicator related to switching between a frequency division multiplexing (FDM) mode and a time division multiplexing (TDM) mode for the UE in a MulteFire system, as in block 710. The gNB can comprise one or more processors configured to determine, at the gNB, a resource allocation (RA) for the UE, as in block 720. The gNB can comprise one or more processors configured to select, at the gNB, a self-defer offset for the UE, wherein the self-defer offset indicates a starting position for a GUL transmission from the UE operating in the FDM mode or the TDM mode, as in block 730. The gNB can comprise one or more processors configured to select, at the gNB, a demodulation reference signal (DMRS) configuration for the GUL transmission from the UE, as in block 740. The gNB can comprise one or more processors configured to encode, at the gNB, the mode switching indicator, the RA, the self-defer offset and the DMRS configuration for transmission to the UE, as in block 750. In addition, the gNB can comprise a memory interface configured to retrieve from a memory the mode switching indicator, the RA, the self-defer offset and the DMRS configuration.

Figure 8:
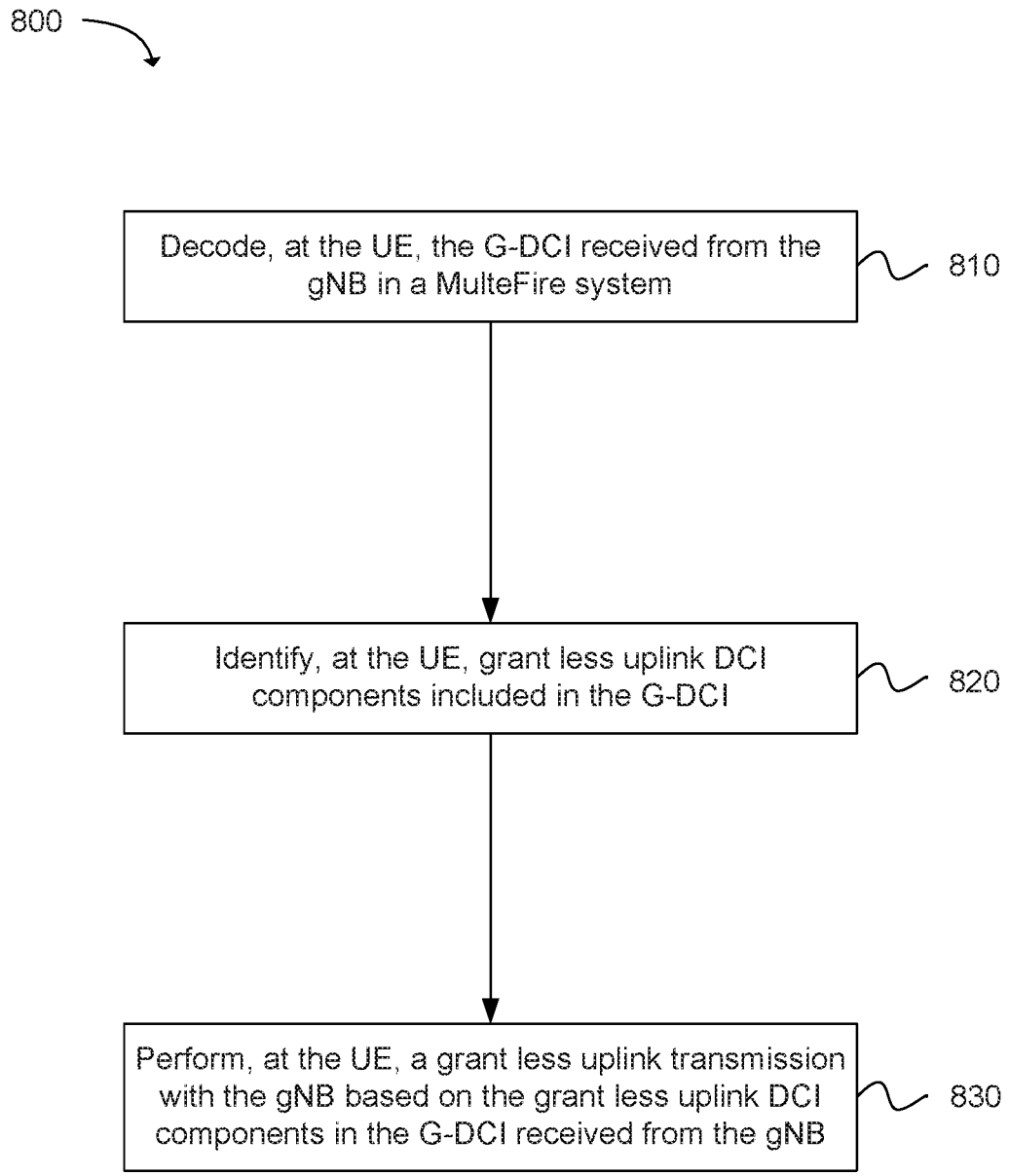
FIG. 8 depicts functionality of a user equipment (UE) operable to decode grant less downlink control information (G-DCI) received from a Next Generation NodeB (gNB) in accordance with an example.

Another example provides functionality 800 of a user equipment (UE) operable to decode grant less downlink control information (G-DCI) received from a Next Generation NodeB (gNB), as shown in FIG. 8. The UE can comprise one or more processors configured to decode, at the UE, the G-DCI received from the gNB in a MulteFire system, as in block 810. The UE can comprise one or more processors configured to identify, at the UE, grant less uplink DCI components included in the G-DCI, as in block 820. The UE can comprise one or more processors configured to perform, at the UE, a grant less uplink transmission with the gNB based on the grant less uplink DCI components in the G-DCI received from the gNB, as in block 830. In addition, the UE can comprise a memory interface configured to send to a memory the G-DCI.

Figure 9:
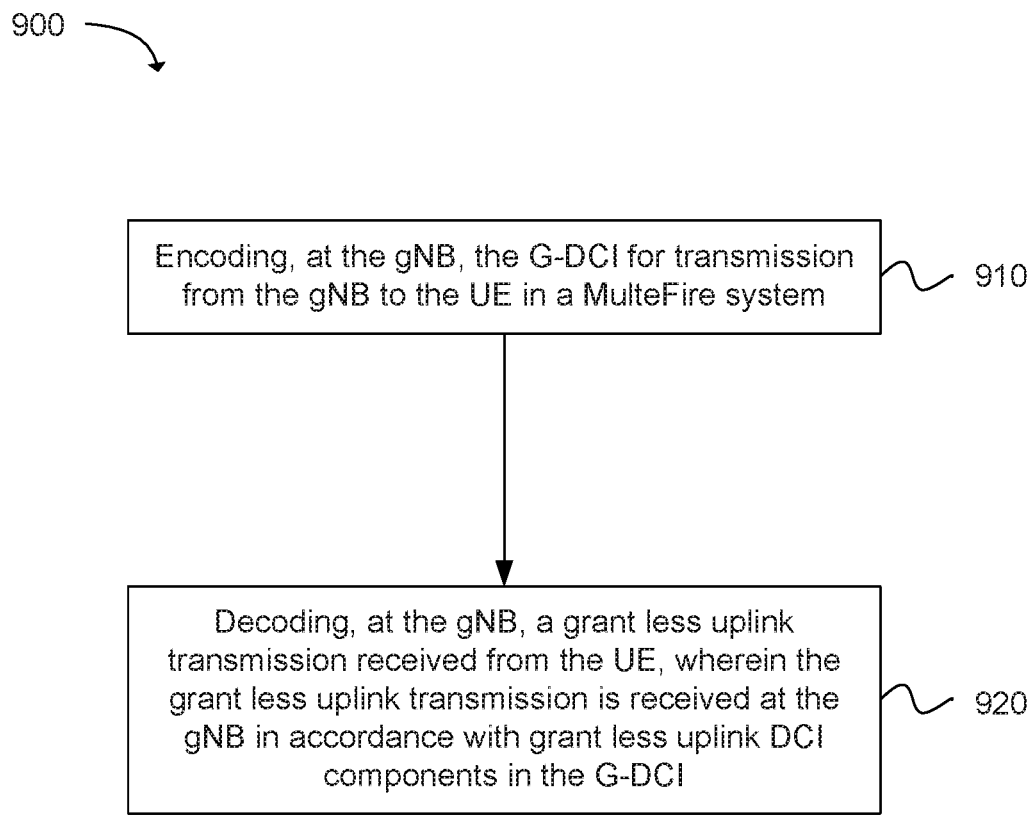
FIG. 9 depicts a flowchart of a machine readable storage medium having instructions embodied thereon for encoding grant less downlink control information (G-DCI) for transmission from a Next Generation NodeB (gNB) to a user equipment (UE) in accordance with an example.

Another example provides at least one machine readable storage medium having instructions 900 embodied thereon for encoding grant less downlink control information (G-DCI) for transmission from a Next Generation NodeB (gNB) to a user equipment (UE), as shown in FIG. 9. The instructions can be executed on a machine, where the instructions are included on at least one computer readable medium or one non-transitory machine readable storage medium. The instructions when executed by one or more processors of the gNB perform: encoding, at the gNB, the G-DCI for transmission from the gNB to the UE in a MulteFire system, as in block 910. The instructions when executed by one or more processors of the gNB perform: decoding, at the gNB, a grant less uplink transmission received from the UE, wherein the grant less uplink transmission is received at the gNB in accordance with grant less uplink DCI components in the G-DCI, as in block 920.

Figure 10:
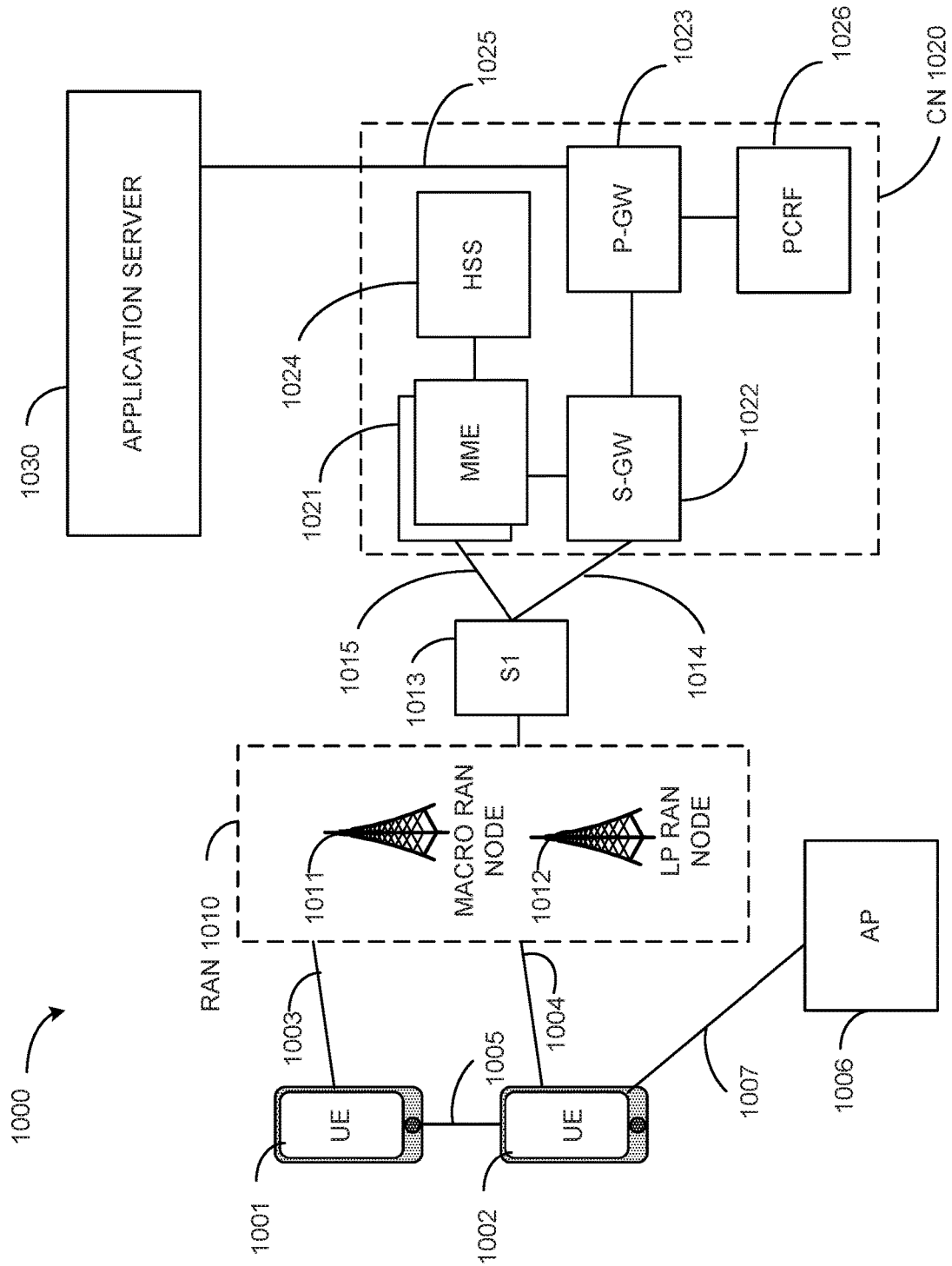
FIG. 10 illustrates an architecture of a wireless network in accordance with an example.

FIG. 10 illustrates an architecture of a system 1000 of a network in accordance with some embodiments. The system 1000 is shown to include a user equipment (UE) 1001 and a UE 1002. The UEs 1001 and 1002 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1001 and 1002 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1001 and 1002 may be configured to connect, e.g., communicatively couple, with a radio access network (RAN) 1010—the RAN 1010 may be, for example, an Evolved Universal Mobile Telecommunications System (UMTS) Terrestrial Radio Access Network (E-UTRAN), a NextGen RAN (NG RAN), or some other type of RAN. The UEs 1001 and 1002 utilize connections 1003 and 1004, respectively, each of which comprises a physical communications interface or layer (discussed in further detail below); in this example, the connections 1003 and 1004 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1001 and 1002 may further directly exchange communication data via a ProSe interface 1005. The ProSe interface 1005 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1002 is shown to be configured to access an access point (AP) 1006 via connection 1007. The connection 1007 can comprise a local wireless connection, such as a connection consistent with any IEEE 1102.15 protocol, wherein the AP 1006 would comprise a wireless fidelity (WiFi®) router. In this example, the AP 1006 is shown to be connected to the Internet without connecting to the core network of the wireless system (described in further detail below).

The RAN 1010 can include one or more access nodes that enable the connections 1003 and 1004. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1010 may include one or more RAN nodes for providing macrocells, e.g., macro RAN node 1011, and one or more RAN nodes for providing femtocells or picocells (e.g., cells having smaller coverage areas, smaller user capacity, or higher bandwidth compared to macrocells), e.g., low power (LP) RAN node 1012.

Any of the RAN nodes 1011 and 1012 can terminate the air interface protocol and can be the first point of contact for the UEs 1001 and 1002. In some embodiments, any of the RAN nodes 1011 and 1012 can fulfill various logical functions for the RAN 1010 including, but not limited to, radio network controller (RNC) functions such as radio bearer management, uplink and downlink dynamic radio resource management and data packet scheduling, and mobility management.

In accordance with some embodiments, the UEs 1001 and 1002 can be configured to communicate using Orthogonal Frequency-Division Multiplexing (OFDM) communication signals with each other or with any of the RAN nodes 1011 and 1012 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1011 and 1012 to the UEs 1001 and 1002, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1001 and 1002. The physical downlink control channel (PDCCH) may carry information about the transport format and resource allocations related to the PDSCH channel, among other things. It may also inform the UEs 1001 and 1002 about the transport format, resource allocation, and H-ARQ (Hybrid Automatic Repeat Request) information related to the uplink shared channel. Typically, downlink scheduling (assigning control and shared channel resource blocks to the UE 1002 within a cell) may be performed at any of the RAN nodes 1011 and 1012 based on channel quality information fed back from any of the UEs 1001 and 1002. The downlink resource assignment information may be sent on the PDCCH used for (e.g., assigned to) each of the UEs 1001 and 1002.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 11).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1010 is shown to be communicatively coupled to a core network (CN) 1020—via an S1 interface 1013. In embodiments, the CN 1020 may be an evolved packet core (EPC) network, a NextGen Packet Core (NPC) network, or some other type of CN. In this embodiment the S1 interface 1013 is split into two parts: the S1-U interface 1014, which carries traffic data between the RAN nodes 1011 and 1012 and the serving gateway (S-GW) 1022, and the S1-mobility management entity (MME) interface 1015, which is a signaling interface between the RAN nodes 1011 and 1012 and MMEs 1021.

In this embodiment, the CN 1020 comprises the MMEs 1021, the S-GW 1022, the Packet Data Network (PDN) Gateway (P-GW) 1023, and a home subscriber server (HSS) 1024. The MMEs 1021 may be similar in function to the control plane of legacy Serving General Packet Radio Service (GPRS) Support Nodes (SGSN). The MMEs 1021 may manage mobility aspects in access such as gateway selection and tracking area list management. The HSS 1024 may comprise a database for network users, including subscription-related information to support the network entities' handling of communication sessions. The CN 1020 may comprise one or several HSSs 1024, depending on the number of mobile subscribers, on the capacity of the equipment, on the organization of the network, etc. For example, the HSS 1024 can provide support for routing/roaming, authentication, authorization, naming/addressing resolution, location dependencies, etc.

The S-GW 1022 may terminate the S1 interface 1013 towards the RAN 1010, and routes data packets between the RAN 1010 and the CN 1020. In addition, the S-GW 1022 may be a local mobility anchor point for inter-RAN node handovers and also may provide an anchor for inter-3GPP mobility. Other responsibilities may include lawful intercept, charging, and some policy enforcement.

The P-GW 1023 may terminate an SGi interface toward a PDN. The P-GW 1023 may route data packets between the EPC network and external networks such as a network including the application server 1030 (alternatively referred to as application function (AF)) via an Internet Protocol (IP) interface 1025. Generally, the application server 1030 may be an element offering applications that use IP bearer resources with the core network (e.g., UMTS Packet Services (PS) domain, LTE PS data services, etc.). In this embodiment, the P-GW 1023 is shown to be communicatively coupled to an application server 1030 via an IP communications interface 1025. The application server 1030 can also be configured to support one or more communication services (e.g., Voice-over-Internet Protocol (VoIP) sessions, PTT sessions, group communication sessions, social networking services, etc.) for the UEs 1001 and 1002 via the CN 1020.

The P-GW 1023 may further be a node for policy enforcement and charging data collection. Policy and Charging Enforcement Function (PCRF) 1026 is the policy and charging control element of the CN 1020. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1026 may be communicatively coupled to the application server 1030 via the P-GW 1023. The application server 1030 may signal the PCRF 1026 to indicate a new service flow and select the appropriate Quality of Service (QoS) and charging parameters. The PCRF 1026 may provision this rule into a Policy and Charging Enforcement Function (PCEF) (not shown) with the appropriate traffic flow template (TFT) and QoS class of identifier (QCI), which commences the QoS and charging as specified by the application server 1030.

Figure 11:
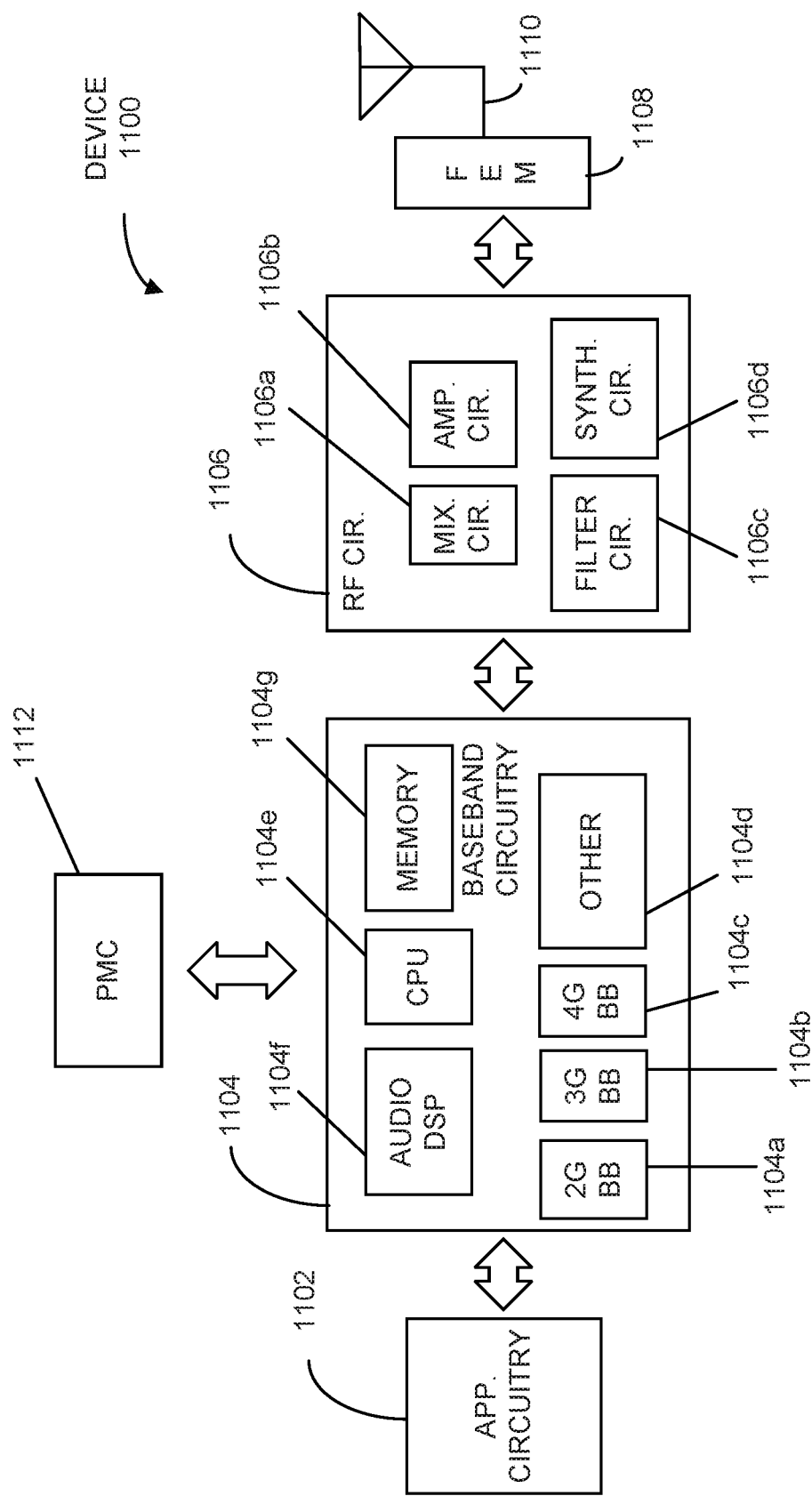
FIG. 11 illustrates a diagram of a wireless device (e.g., UE) in accordance with an example.

FIG. 11 illustrates example components of a device 1100 in accordance with some embodiments. In some embodiments, the device 1100 may include application circuitry 1102, baseband circuitry 1104, Radio Frequency (RF) circuitry 1106, front-end module (FEM) circuitry 1108, one or more antennas 1110, and power management circuitry (PMC) 1112 coupled together at least as shown. The components of the illustrated device 1100 may be included in a UE or a RAN node. In some embodiments, the device 1100 may include less elements (e.g., a RAN node may not utilize application circuitry 1102, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1102 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1106 and to generate baseband signals for a transmit signal path of the RF circuitry 1106. Baseband processing circuitry 1104 may interface with the application circuitry 1102 for generation and processing of the baseband signals and for controlling operations of the RF circuitry 1106. For example, in some embodiments, the baseband circuitry 1104 may include a third generation (3G) baseband processor 1104a, a fourth generation (4G) baseband processor 1104b, a fifth generation (5G) baseband processor 1104c, or other baseband processor(s) 1104d for other existing generations, generations in development or to be developed in the future (e.g., second generation (2G), sixth generation (6G), etc.). The baseband circuitry 1104 (e.g., one or more of baseband processors 1104a-d) may handle various radio control functions that enable communication with one or more radio networks via the RF circuitry 1106. In other embodiments, some or all of the functionality of baseband processors 1104a-d may be included in modules stored in the memory 1104g and executed via a Central Processing Unit (CPU) 1104e. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, or constellation mapping/demapping functionality. In some embodiments, encoding/decoding circuitry of the baseband circuitry 1104 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include one or more audio digital signal processor(s) (DSP) 1104f. The audio DSP(s) 1104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the receive signal path of the RF circuitry 1106 may include mixer circuitry 1106a, amplifier circuitry 1106b and filter circuitry 1106c. In some embodiments, the transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a necessity. In some embodiments, mixer circuitry 1106a of the receive signal path may comprise passive mixers, although the scope of the embodiments is not limited in this respect.

In some embodiments, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1104 and may be filtered by filter circuitry 1106c.

In some embodiments, the mixer circuitry 1106a of the receive signal path and the mixer circuitry 1106a of the transmit signal path may include two or more mixers and may be arranged for quadrature downconversion and upconversion, respectively. In some embodiments, the mixer circuitry 1106a of the receive signal path and the mixer circuitry 1106a of the transmit signal path may include two or more mixers and may be arranged for image rejection (e.g., Hartley image rejection). In some embodiments, the mixer circuitry 1106a of the receive signal path and the mixer circuitry 1106a may be arranged for direct downconversion and direct upconversion, respectively. In some embodiments, the mixer circuitry 1106a of the receive signal path and the mixer circuitry 1106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106d may be a fractional-N synthesizer or a fractional N/N+1 synthesizer, although the scope of the embodiments is not limited in this respect as other types of frequency synthesizers may be suitable. For example, synthesizer circuitry 1106*d* may be a delta-sigma synthesizer, a frequency multiplier, or a synthesizer comprising a phase-locked loop with a frequency divider.

The synthesizer circuitry 1106*d* may be configured to synthesize an output frequency for use by the mixer circuitry 1106*a* of the RF circuitry 1106 based on a frequency input and a divider control input. In some embodiments, the synthesizer circuitry 1106*d* may be a fractional N/N+1 synthesizer.

In some embodiments, frequency input may be provided by a voltage controlled oscillator (VCO), although that is not a necessity. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106*d* of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop.

In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110. In various embodiments, the amplification through the transmit or receive signal paths may be done solely in the RF circuitry 1106, solely in the FEM 1108, or in both the RF circuitry 1106 and the FEM 1108.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110).

In some embodiments, the PMC 1112 may manage power provided to the baseband circuitry 1104. In particular, the PMC 1112 may control power-source selection, voltage scaling, battery charging, or DC-to-DC conversion. The PMC 1112 may often be included when the device 1100 is capable of being powered by a battery, for example, when the device is included in a UE. The PMC 1112 may increase the power conversion efficiency while providing desirable implementation size and heat dissipation characteristics.

While FIG. 11 shows the PMC 1112 coupled only with the baseband circuitry 1104. However, in other embodiments, the PMC 11 12 may be additionally or alternatively coupled with, and perform similar power management operations for, other components such as, but not limited to, application circuitry 1102, RF circuitry 1106, or FEM 1108.

In some embodiments, the PMC 1112 may control, or otherwise be part of, various power saving mechanisms of the device 1100. For example, if the device 1100 is in an RRC_Connected state, where it is still connected to the RAN node as it expects to receive traffic shortly, then it may enter a state known as Discontinuous Reception Mode (DRX) after a period of inactivity. During this state, the device 1100 may power down for brief intervals of time and thus save power.

If there is no data traffic activity for an extended period of time, then the device 1100 may transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1102 and processors of the baseband circuitry 1104 may be used to execute elements of one or more instances of a protocol stack. For example, processors of the baseband circuitry 1104, alone or in combination, may be used execute Layer 3, Layer 2, or Layer 1 functionality, while processors of the application circuitry 1104 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
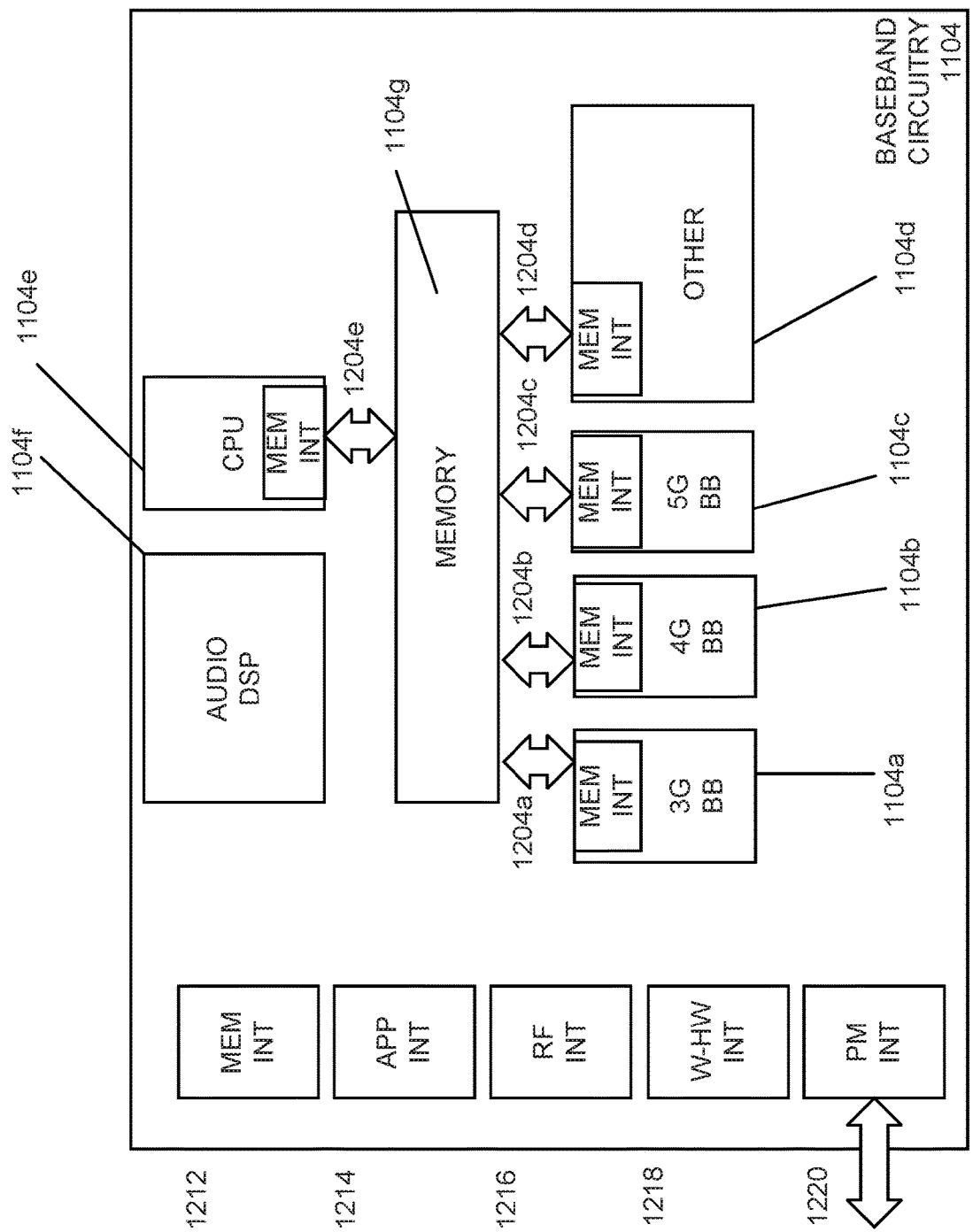
FIG. 12 illustrates interfaces of baseband circuitry in accordance with an example.

FIG. 12 illustrates example interfaces of baseband circuitry in accordance with some embodiments. As discussed above, the baseband circuitry 1104 of FIG. 11 may comprise processors 1104a-1104e and a memory 1104g utilized by said processors. Each of the processors 1104a-1104e may include a memory interface, 1204a-1204e, respectively, to send/receive data to/from the memory 1104g.

The baseband circuitry 1104 may further include one or more interfaces to communicatively couple to other circuitries/devices, such as a memory interface 1212 (e.g., an interface to send/receive data to/from memory external to the baseband circuitry 1104), an application circuitry interface 1214 (e.g., an interface to send/receive data to/from the application circuitry 1102 of FIG. 11), an RF circuitry interface 1216 (e.g., an interface to send/receive data to/from RF circuitry 1106 of FIG. 11), a wireless hardware connectivity interface 1218 (e.g., an interface to send/receive data to/from Near Field Communication (NFC) components, Bluetooth® components (e.g., Bluetooth® Low Energy), Wi-Fi® components, and other communication components), and a power management interface 1220 (e.g., an interface to send/receive power or control signals to/from the PMC 1112.

Figure 13:
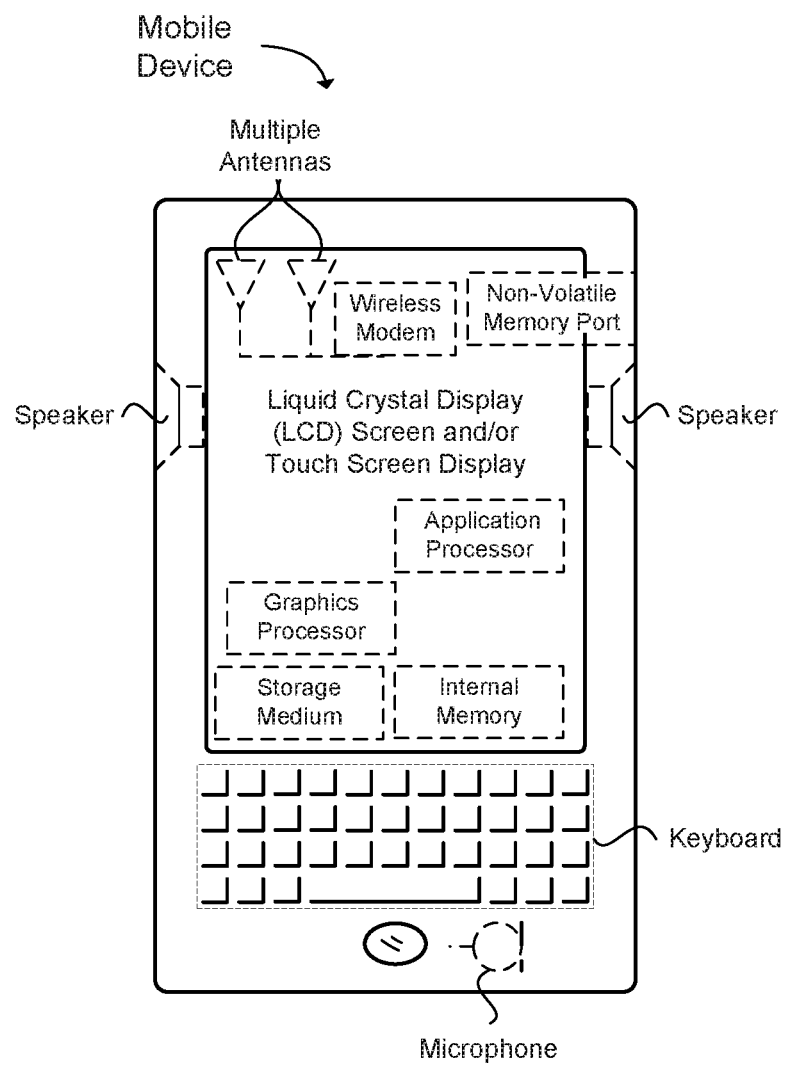
FIG. 13 illustrates a diagram of a wireless device (e.g., UE) in accordance with an example.

FIG. 13 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 13 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a Next Generation NodeB (gNB) operable to configure a user equipment (UE) for grant less uplink (GUL) transmissions to the gNB, the apparatus comprising: one or more processors configured to: identify, at the gNB, a mode switching indicator related to switching between a frequency division multiplexing (FDM) mode and a time division multiplexing (TDM) mode for the UE in a MulteFire system; determine, at the gNB, a resource allocation (RA) for the UE; select, at the gNB, a self-defer offset for the UE, wherein the self-defer offset indicates a starting position for a GUL transmission from the UE operating in the FDM mode or the TDM mode; select, at the gNB, a demodulation reference signal (DMRS) configuration for the GUL transmission from the UE; and encode, at the gNB, the mode switching indicator, the RA, the self-defer offset and the DMRS configuration for transmission to the UE; and a memory interface configured to retrieve from a memory the mode switching indicator, the RA, the self-defer offset and the DMRS configuration.

Example 2 includes the apparatus of Example 1, further comprising a transceiver configured to transmit the mode switching indicator, the RA, the self-defer offset and the DMRS configuration to the UE.

Example 3 includes the apparatus of any of Examples 1 to 2, wherein the mode switching indicator includes three bits to indicate the starting position for the GUL transmission when the UE operates in the FDM mode.

Example 4 includes the apparatus of any of Examples 1 to 3, wherein the FDM mode or the TDM mode is implicitly indicated by the gNB via a special configuration of the RA.

Example 5 includes the apparatus of any of Examples 1 to 4, wherein the one or more processors are configured to encode the RA for transmission to the UE via grant less physical uplink shared channel (PUSCH) activation/release downlink control information (DCI).

Example 6 includes the apparatus of any of Examples 1 to 5, wherein the one or more processors are configured to encode the self-defer offset for transmission to the UE via higher layer signaling.

Example 7 includes the apparatus of any of Examples 1 to 6, wherein the DMRS configuration for the GUL transmission is indicated by the gNB via radio resource control (RRC) signaling and the DMRS configuration includes $n_{DMRS}^{(1)}$ and $n_{DMRS,\lambda}^{(2)}$, wherein $n_{DMRS}^{(1)}$ and $n_{DMRS,\lambda}^{(2)}$ represent two DMRS parameters for a cyclic shift and an orthogonal cover code (OCC), wherein least significant bit (LSB) 3 bits are used to indicate a value of $n_{DMRS}^{(1)}$ and most significant bit (MSB) 3 bits are used to indicate a value of $n_{DMRS,\lambda}^{(2)}$ and an OCC configuration.

Example 8 includes an apparatus of a user equipment (UE) operable to decode grant less downlink control information (G-DCI) received from a Next Generation NodeB (gNB), the apparatus comprising: one or more processors configured to: decode, at the UE, the G-DCI received from the gNB in a MulteFire system; identify, at the UE, grant less uplink DCI components included in the G-DCI; and perform, at the UE, a grant less uplink transmission with the gNB based on the grant less uplink DCI components in the G-DCI received from the gNB; and a memory interface configured to send to a memory the G-DCI.

Example 9 includes the apparatus of Example 8, further comprising a transceiver configured to: receive the G-DCI from the gNB; and send the grant less uplink transmission to the gNB.

Example 10 includes the apparatus of any of Examples 8 to 9, wherein the G-DCI is a grant less activation/release DCI, wherein the G-DCI is for acknowledgement (ACK) or negative ACK (NACK) for a grant less transmission (Tx), wherein the grant less activation/release DCI is DCI to activate or release a grant less feature.

Example 11 includes the apparatus of any of Examples 8 to 10, wherein the G-DCI includes a bit field with a flag that differentiates the G-DCI as corresponding to G-DCI or grant less activation/release DCI.

Example 12 includes the apparatus of any of Examples 8 to 11, wherein the grant less activation/release DCI includes a maximum transport block (TB) number configuration from the gNB.

Example 13 includes the apparatus of any of Examples 8 to 12, wherein the grant less activation/release DCI includes a two modulation and coding scheme (MCS) field, wherein an MCS of a second transport block (TB) is set to 29 indicating that the second TB is disabled and the grant less activation/release DCI corresponds to one TB information, or the grant less activation/release DCI corresponds to two TB information.

Example 14 includes the apparatus of any of Examples 8 to 13, wherein the G-DCI includes one or more of: a transmit power control (TPC) command for a grant less physical uplink shared channel (PUSCH), wherein the TPC command is provided using two bits; hybrid automatic repeat request acknowledgement (HARQ-ACK) bitmap(s), wherein a number of the HARQ-ACK bitmap(s) is equal to an assigned grant less PUSCH HARQ process number that is specified via radio resource control (RRC) signaling; a modulation and coding scheme (MCS) and redundancy version of a first transport block (TB1) using five bits; an MCS and redundancy version of a second transport block (TB2) using five bits; and precoding information and a number of multiple-input multiple-output (MIMO) layers.

Example 15 includes the apparatus of any of Examples 8 to 14, wherein the G-DCI includes one or more of a transmit power control (TPC) field, a modulation and coding scheme (MCS) or a precoding matrix indicator (PMI), wherein the one or more of the TPC field, the MCS or the PMI is applied on a grant less uplink (GUL) subframe that is transmitted four subframes after a G-DCI subframe.

Example 16 includes the apparatus of any of Examples 8 to 15, wherein the G-DCI is UE-specific and corresponds to format 0A/1A.

Example 17 includes at least one machine readable storage medium having instructions embodied thereon for encoding grant less downlink control information (G-DCI) for transmission from a Next Generation NodeB (gNB) to a user equipment (UE), the instructions when executed by one or more processors at the gNB perform the following: encoding, at the gNB, the G-DCI for transmission from the gNB to the UE in a MulteFire system; and decoding, at the gNB, a grant less uplink transmission received from the UE, wherein the grant less uplink transmission is received at the gNB in accordance with grant less uplink DCI components in the G-DCI.

Example 18 includes the at least one machine readable storage medium of Example 17, wherein the G-DCI is a grant less activation/release DCI, wherein the G-DCI is for acknowledgement (ACK) or negative ACK (NACK) for a grant less transmission (Tx), wherein the grant less activation/release DCI is DCI to activate or release a grant less feature.

Example 19 includes the at least one machine readable storage medium of any of Examples 17 to 18, wherein the G-DCI includes a bit field with a flag that differentiates the G-DCI as corresponding to G-DCI or grant less activation/release DCI.

Example 20 includes the at least one machine readable storage medium of any of Examples 17 to 19, wherein the grant less activation/release DCI includes a maximum transport block (TB) number configuration from the gNB.

Example 21 includes the at least one machine readable storage medium of any of Examples 17 to 20, wherein the grant less activation/release DCI includes a two modulation and coding scheme (MCS) field, wherein an MCS of a second transport block (TB) is set to 29 indicating that the second TB is disabled and the grant less activation/release DCI corresponds to one TB information, or the grant less activation/release DCI corresponds to two TB information.

Example 22 includes the at least one machine readable storage medium of any of Examples 17 to 21, wherein the G-DCI includes one or more of: a transmit power control (TPC) command for a grant less physical uplink shared channel (PUSCH), wherein the TPC command is provided using two bits; hybrid automatic repeat request acknowledgement (HARQ-ACK) bitmap(s), wherein a number of the HARQ-ACK bitmap(s) is equal to an assigned grant less PUSCH HARQ process number that is specified via radio resource control (RRC) signaling; a modulation and coding scheme (MCS) and redundancy version of a first transport block (TB1) using five bits; an MCS and redundancy version of a second transport block (TB2) using five bits; and precoding information and a number of multiple-input multiple-output (MIMO) layers.

Example 23 includes the at least one machine readable storage medium of any of Examples 17 to 22, wherein the G-DCI includes one or more of a transmit power control (TPC) field, a modulation and coding scheme (MCS) or a precoding matrix indicator (PMI), wherein the one or more of the TPC field, the MCS or the PMI is applied on a grant less uplink (GUL) subframe that is transmitted four subframes after a G-DCI subframe.

Example 24 includes a Next Generation NodeB (gNB) operable to encode grant less downlink control information (G-DCI) for transmission to a user equipment (UE), the gNB comprising: means for encoding, at the gNB, the G-DCI for transmission from the gNB to the UE in a MulteFire system; and means for decoding, at the gNB, a grant less uplink transmission received from the UE, wherein the grant less uplink transmission is received at the gNB in accordance with grant less uplink DCI components in the G-DCI.

Example 25 includes the gNB of Example 24, wherein the G-DCI is a grant less activation/release DCI, wherein the G-DCI is for acknowledgement (ACK) or negative ACK (NACK) for a grant less transmission (Tx), wherein the grant less activation/release DCI is DCI to activate or release a grant less feature.

Example 26 includes the gNB of any of Examples 24 to 25, wherein the G-DCI includes a bit field with a flag that differentiates the G-DCI as corresponding to G-DCI or grant less activation/release DCI.

Example 27 includes the gNB of any of Examples 24 to 26, wherein the grant less activation/release DCI includes a maximum transport block (TB) number configuration from the gNB.

Example 28 includes the gNB of any of Examples 24 to 27, wherein the grant less activation/release DCI includes a two modulation and coding scheme (MCS) field, wherein an MCS of a second transport block (TB) is set to 29 indicating that the second TB is disabled and the grant less activation/release DCI corresponds to one TB information, or the grant less activation/release DCI corresponds to two TB information.

Example 29 includes the gNB of any of Examples 24 to 28, wherein the G-DCI includes one or more of: a transmit power control (TPC) command for a grant less physical uplink shared channel (PUSCH), wherein the TPC command is provided using two bits; hybrid automatic repeat request acknowledgement (HARQ-ACK) bitmap(s), wherein a number of the HARQ-ACK bitmap(s) is equal to an assigned grant less PUSCH HARQ process number that is specified via radio resource control (RRC) signaling; a modulation and coding scheme (MCS) and redundancy version of a first transport block (TB1) using five bits; an MCS and redundancy version of a second transport block (TB2) using five bits; and precoding information and a number of multiple-input multiple-output (MIMO) layers.

Example 30 includes the gNB of any of Examples 24 to 29, wherein the G-DCI includes one or more of a transmit power control (TPC) field, a modulation and coding scheme (MCS) or a precoding matrix indicator (PMI), wherein the one or more of the TPC field, the MCS or the PMI is applied on a grant less uplink (GUL) subframe that is transmitted four subframes after a G-DCI subframe.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a base station operable to configure a user equipment (UE) for grant less uplink (GUL) transmissions in a cell, the apparatus comprising:
    one or more processors configured to:
    select, at the base station in the cell, a demodulation reference signal (DMRS) configuration for a GUL transmission from the UE, wherein the DMRS configuration includes $n_{DMRS}^{(1)}$ and $n_{DMRS,\lambda}^{(2)}$, wherein $n_{DMRS}^{(1)}$ and $n_{DMRS,\lambda}^{(2)}$ represent two DMRS parameters for a cyclic shift and an orthogonal sequence ($w^{(\lambda)}(m)$);
    select, at the base station, a starting position for a GUL transmission from the UE;
    determine, at the base station, a resource allocation (RA) for the UE; and
    encode, at the base station, the DMRS configuration, the starting position and the RA for transmission to the UE; and
    a memory interface configured to retrieve from a memory the DMRS configuration, the starting position and the RA.

2. The apparatus of claim 1, further comprising a transceiver configured to transmit the DMRS configuration, the starting position and the RA to the UE.

3. The apparatus of claim 1, wherein the one or more processors are configured to encode the RA for transmission to the UE via grant less physical uplink shared channel (PUSCH) activation/release downlink control information (DCI).

4. The apparatus of claim 1, wherein the DMRS configuration for the GUL transmission is indicated by the base station via radio resource control (RRC) signaling.

5. The apparatus of claim 1, wherein a value of $n_{DMRS}^{(1)}$ in the DMRS configuration for the GUL transmission is given by the following:

| cyclicShift | cyclicShift1-R1-1 | $n_{DMRS}^{(1)}$ |
|---|---|---|
| 0 | 000 | 0 |
| 1 | 001 | 2 |
| 2 | 010 | 3 |
| 3 | 011 | 4 |
| 4 | 100 | 6 |
| 5 | 101 | 8 |
| 6 | 110 | 9 |
| 7 | 111 | 10. |

6. The apparatus of claim 1, wherein a value of $n_{DMRS,\lambda}^{(2)}$ and a value of the orthogonal sequence ($w^{(\lambda)}(m)$) in the DMRS configuration for the GUL transmission is given by the following:

| Cyclic Shift Field in uplink-related DCI format [3] or cyclicShift2-R1-1 | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1]. |

7. An apparatus of a user equipment (UE) operable to decode grant less downlink control information (G-DCI) received from a base station, the apparatus comprising:
    one or more processors configured to:
    decode, at the UE, the G-DCI received from the base station in a wireless system;
    identify, at the UE, grant less uplink DCI components included in the G-DCI; and
    perform, at the UE, a grant less uplink transmission with the base station based on the grant less uplink DCI components in the G-DCI received from the base station; and
    a memory interface configured to send to a memory the G-DCI,
    wherein the G-DCI includes a bit field with a flag that differentiates the G-DCI as corresponding to the G-DCI or a grant less activation/release DCI.

8. The apparatus of claim 7, further comprising a transceiver configured to:
    receive the G-DCI from the base station; and
    send the grant less uplink transmission to the base station.

9. The apparatus of claim 7 wherein the grant less activation/release DCI includes a maximum transport block (TB) number configuration from the base station.

10. The apparatus of claim 7, wherein the grant less activation/release DCI includes a two modulation and coding scheme (MCS) field, wherein an MCS of a second transport block (TB) is set to 29 indicating that the second TB is disabled and the grant less activation/release DCI corresponds to one TB information, or the grant less activation/release DCI corresponds to two TB information.

11. The apparatus of claim 7, wherein the G-DCI includes one or more of:
    a transmit power control (TPC) command for a grant less physical uplink shared channel (PUSCH), wherein the TPC command is provided using two bits;
    hybrid automatic repeat request acknowledgement (HARQ-ACK) bitmap(s), wherein a number of the HARQ-ACK bitmap(s) is equal to an assigned grant less PUSCH HARQ process number that is specified via radio resource control (RRC) signaling;
    a modulation and coding scheme (MCS) and redundancy version of a first transport block (TB1) using five bits;
    an MCS and redundancy version of a second transport block (TB2) using five bits; and precoding information and a number of multiple-input multiple-output (MIMO) layers.

12. The apparatus of claim 7, wherein the G-DCI includes one or more of a transmit power control (TPC) field, a modulation and coding scheme (MCS) or a precoding matrix indicator (PMI), wherein the one or more of the TPC field, the MCS or the PMI is applied on a grant less uplink (GUL) subframe that is transmitted four subframes after a G-DCI subframe.

13. The apparatus of claim 7, wherein the G-DCI is UE-specific and corresponds to format 0A/1A.

14. At least one non-transitory machine readable storage medium having instructions embodied thereon for configuring a user equipment (UE) for grant less uplink (GUL) transmissions, the instructions when executed by one or more processors at a base station perform the following:
identifying, at the base station, a mode switching indicator related to switching between a frequency division multiplexing (FDM) mode and a time division multiplexing (TDM) mode for the UE in a wireless system;
determining, at the base station, a resource allocation (RA) for the UE;
selecting, at the base station, a self-defer offset for the UE, wherein the self-defer offset indicates a starting position for a GUL transmission from the UE operating in the FDM mode or the TDM mode;
selecting, at the base station, a demodulation reference signal (DMRS) configuration for the GUL transmission from the UE; and
encoding, at the base station, the mode switching indicator, the RA, the self-defer offset and the DMRS configuration for transmission to the UE.

15. The at least one non-transitory machine readable storage medium of claim 14, wherein the mode switching indicator includes three bits to indicate the starting position for the GUL transmission when the UE operates in the FDM mode.

16. The at least one non-transitory machine readable storage medium of claim 14, wherein the FDM mode or the TDM mode is implicitly indicated by the base station via a special configuration of the RA.

17. The at least one non-transitory machine readable storage medium of claim 14, further comprising instructions when executed perform the following: encoding the RA for transmission to the UE via grant less physical uplink shared channel (PUSCH) activation/release downlink control information (DCI).

18. The at least one non-transitory machine readable storage medium of claim 14, further comprising instructions when executed perform the following: encoding the self-defer offset for transmission to the UE via higher layer signaling.

19. The at least one non-transitory machine readable storage medium of claim 14, wherein the DMRS configuration for the GUL transmission is indicated by the base station via radio resource control (RRC) signaling and the DMRS configuration includes $n_{DMRS}^{(1)}$ and $n_{DMRS,80}^{(2)}$, wherein $n_{DMRS}^{(1)}$ and $n_{DMRS}^{(1)}$ represent two DMRS parameters for a cyclic shift and an orthogonal cover code (OCC), wherein least significant bit (LSB) 3 bits are used to indicate a value of $n_{DMRS}^{(1)}$ and most significant bit (MSB) 3 bits are used to indicate a value of $n_{DMRS,\lambda}^{(2)}$, and an OCC configuration.

* * * * *